J. FLANAGIN.
Plow-Trucks.
No. 139,564. Patented June 3, 1873.
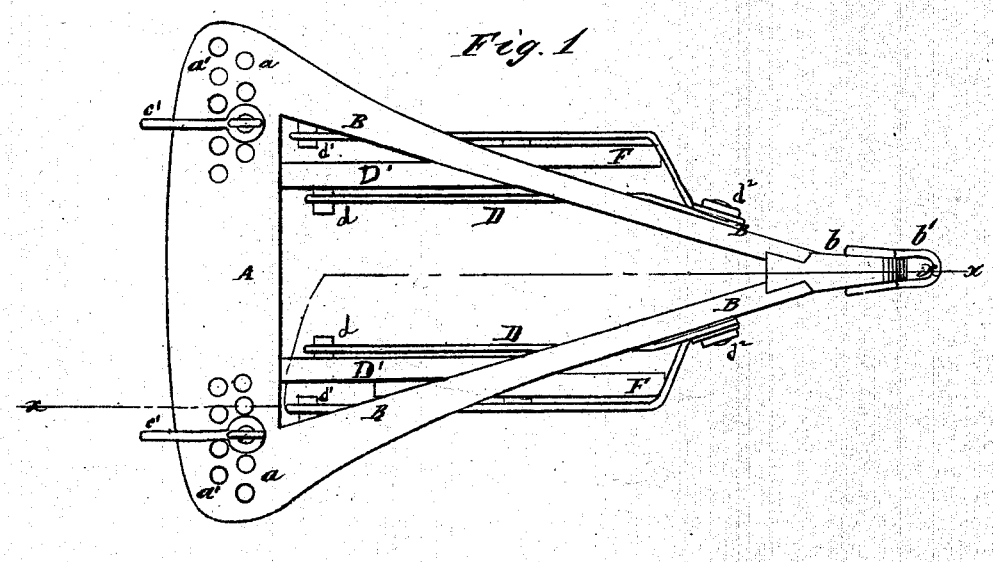
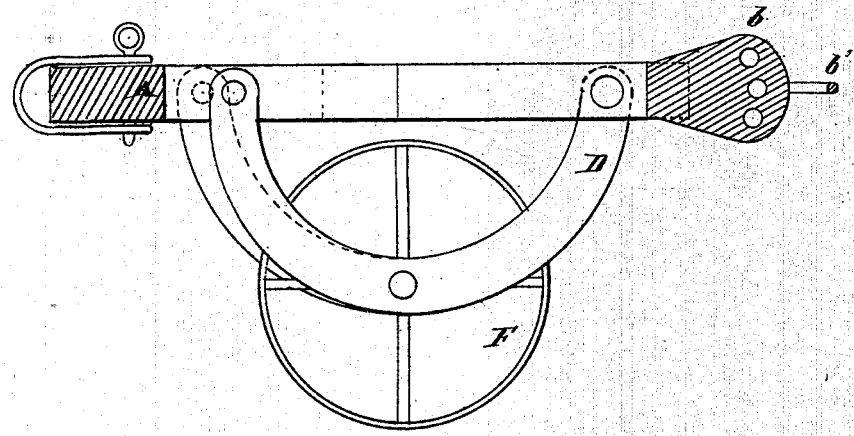
Witnesses:
Inventor:
J. Flanagin
Per Munn & Co
Attorneys.

UNITED STATES PATENT OFFICE.

JOHN FLANAGIN, OF PAWNEE CITY, NEBRASKA.

IMPROVEMENT IN PLOW-TRUCKS.

Specification forming part of Letters Patent No. 139,564, dated June 3, 1873; application filed March 1, 1873.

*To all whom it may concern:*

Be it known that I, JOHN FLANAGIN, of Pawnee City, in the county of Pawnee and State of Nebraska, have invented a new and Improved Plow-Truck; and I do hereby declare that the following is a full, clear, and exact description of the same, reference being had to the accompanying drawing forming a part of this specification:

The invention relates generally to gang-plows, and particularly to the mode of arranging plows of unequal size in the same gang so that rows may be plowed out deeply, except in close proximity to the plants, where the brace-roots would be too much fractured and injured; also, to adapt a single turn-plow to be worked without necessitating either horse to tread in the furrow or upon the plowed ground.

The invention consists in a triangular wheeled plow-truck, in whose front is the clevis, to which the whiffletree is attached, and at whose rear are placed one or more adjustable clevises, to which are attached the plow or plows.

Figure 1 is a plan view of my truck; Fig. 2, a side elevation, partly in section; and Fig. 3 a plan view of the truck with a gang of plows appended thereto.

In the drawing, A B is a frame, triangular, or nearly so, and provided with draft-bar $b$ and clevis $b'$. The rear bar A has two rows, $a$ $a'$, of perforations at each end, while C C' are two plows, whose clevises $c$ $c'$ are placed in the holes $a$ or $a'$. $d$ $d$ are two side studs on the longitudinal pieces D' D'; and $d^1$ $d^1$ similar studs on the inside of bars B B, while $d^2$ $d^2$ are like studs on the outside and front of said bars B B. To these studs are attached, in any suitable manner, the hangers D D, in which are journaled the wheels F F.

The application is as follows: If it is desired to use plows of the same size, they are placed at the same distance from the middle of bar A. When unequal plows are to be used, the smaller plow is placed at a greater distance.

This adaptability of my plow-truck renders it a very convenient and useful implement to the public.

Having thus described my invention, what I claim as new, and desire to secure by Letters Patent, is—

The triangular plow-truck A B B placed upon wheels, having one or more sets of perforations at each end of bar A, and the clevis-bar at the junction of bars B B, as and for the purpose described.

JOHN FLANAGIN.

Witnesses:
W. H. CURTIS,
JOHN FRIER.